(12) United States Patent
Cho et al.

(10) Patent No.: US 10,227,744 B2
(45) Date of Patent: Mar. 12, 2019

(54) BLOCK FOR PREVENTING SAND EROSION

(71) Applicants: Jun Ho Cho, Seoul (KR); Hee Sung Cho, Seoul (KR)

(72) Inventors: Jun Ho Cho, Seoul (KR); Hee Sung Cho, Seoul (KR)

( * ) Notice: Subject to any disclaimer, the term of this patent is extended or adjusted under 35 U.S.C. 154(b) by 0 days.

(21) Appl. No.: 15/502,107

(22) PCT Filed: Nov. 14, 2016

(86) PCT No.: PCT/KR2016/013082
§ 371 (c)(1),
(2) Date: Feb. 6, 2017

(87) PCT Pub. No.: WO2017/155182
PCT Pub. Date: Sep. 14, 2017

(65) Prior Publication Data
US 2018/0363263 A1    Dec. 20, 2018

(30) Foreign Application Priority Data

Mar. 9, 2016  (KR) .................. 10-2016-0028550

(51) Int. Cl.
*E02B 3/06*     (2006.01)
*E02B 3/14*     (2006.01)
(52) U.S. Cl.
CPC .................... *E02B 3/14* (2013.01)

(58) Field of Classification Search
CPC ................. E02B 3/06; E02B 3/12; E02B 3/14
USPC .................... 405/15–17, 21, 30, 33
See application file for complete search history.

(56) References Cited

U.S. PATENT DOCUMENTS 5,238,326 A * 8/1993 Creter ...................... E02B 3/06
                                                            405/25

FOREIGN PATENT DOCUMENTS

| CA | 2271580 A1 | * | 11/2000 |
| JP | 59-96313 A | * | 6/1984 |
| JP | 2013-60769 A | * | 4/2013 |
| KR | 10-0761875 |   | 9/2007 |

OTHER PUBLICATIONS

English translation of 10-0761875, 11 pages, Sep. 2007.

* cited by examiner

*Primary Examiner* — Sunil Singh
(74) *Attorney, Agent, or Firm* — Antonio Ha & U.S. Patent, LLC

(57) ABSTRACT

The present invention relates to a block structure for preventing sand erosion, more specifically to a block structure for preventing sand erosion, which is positioned in the sea, collects sand pushed into sea according to flow of low tide and pushes the collected sand toward coast or coastal side at high tide in coast or sea near coast according to flow of wave.

6 Claims, 5 Drawing Sheets

(a)

(b)

BLOCK FOR PREVENTING SAND EROSION

CROSS-REFERENCE TO RELATED APPLICATIONS

This patent application is a national-stage application of International Patent Application No. PCT/KR2016/013082 filed on Nov. 14, 2016, which claims priority under 35 U.S.C. § 119 to Korean Patent Application No. 10-2016-0028550, filed on Mar. 9, 2016, in the Korean Intellectual Property Office, the disclosure of which is incorporated by reference herein in its entirety.

TECHNICAL FIELD

The present invention relates to a block structure for preventing sand erosion, and more specifically, to a block structure for preventing sand erosion, which is positioned in the sea, collects sand pushed into the sea at low tide, and pushes away sand collected in the coast or coastal side at high tide.

DISCUSSION OF RELATED ART

Conventional methods for preventing erosion of soft ground by waves are to build breakwaters using structures, e.g., natural stone, artificial seaweed, or tetrapod structures. However, natural stone structures suffer from the problem that they may be sunken and collapsed by waves. Artificial seaweed structures have a limited effect in attenuating wave. The tetrapod has many problems due to a high risk of accidents by its height and peculiar structure to cause gaps into which people frequently fall to cause death or injury.

To overcome such limit of the conventional techniques, Korean Patent No. 10-0761875 discloses a functional sofa block. However, in order to install the sofa block, a slag layer and a waterproof layer should be formed on a soft ground, resulting in inefficiency because the installation cost is increased and the operation procedure is difficult. Thus, this approach cannot compete with a new method for a fundamental structure to prevent sand loss through wave attenuation as proposed by the present invention.

Further, various conventional techniques have been proposed to reduce the intensity of waves. Such conventional techniques, although able to reduce the intensity of waves, cannot prevent sand in the sea near the coast or sand in the coast from moving into the sea nor can they offer a solution to move the sand back to the coast once moved into the sea.

SUMMARY

The present invention has been provided in order to solve the above-described problems of the prior art, and an object of the present invention is to provide a block structure for preventing sand erosion, which is positioned in the sea and may prevent sand loss on the coast.

Another object of the present invention is to provide a block structure for preventing sand erosion, capable of actively coping with the height and speed of a wave varying rather than fixed in one form.

Still another object of the present invention is to provide a block structure for preventing sand erosion, which may be installed and assembled in various ways by selecting an appropriate block body according to topography, environment, a shape of tide, and a shape of beach.

Still another object of the present invention is to provide a block structure for preventing sand erosion, capable of easily collecting sand pushed by low tide and returning it to a direction in which the sand is pushed back during high tide.

Still another object of the present invention is to provide a block structure for preventing sand erosion, capable of preventing sand loss due to the waves advancing or retreating from the coast to the continental shelf, as well as the loss of sand moving to the side along with an offshore current.

According to the present invention for achieving the objects as described above, a block structure for preventing sand erosion of comprises a first block body 100 comprising a first wing portion 120 facing a sea and having an inclined surface gradually increasing from an outer side to a central side, a first inclined portion 140 positioned opposite the first wing portion 120 and having an inclined surface gradually increasing from an outer side to a central side and having a hook shaped end, and a first base portion 160 constituting a lower body of the first wing portion 120 and the first inclined portion 140 and a second block body 200 shaped as a long bar longer than the first block body 100 and positioned at a side of the first block body 100, the second block body 200 comprising, a second wing portion 220 facing sea and having an inclined surface gradually increasing from an outer side to a central side, a second inclined portion 240 positioned opposite the second wing portion 220, and facing a coastal side, and having a hook shaped end, a second base portion 260 constituting a lower body of the second wing portion 220 and the second inclined portion 240 and of which a stepped portion is formed on each end, and a second extension portion 270 extendedly coupled with the stepped portion formed on each end of the second base portion 260 in a longitudinal direction and having rounded upper surface, wherein the first block body and the second block body are arranged side by side in plurality.

According to another characteristic of the present invention for achieving the objects as described above, the block structure further comprises a bar-shaped third block body 300 comprising a third base portion 360 having a rounded upper surface and a stepped portion formed on each end in a longitudinal direction of a lower body thereof, and a third extension portion 370 extendedly coupling with the stepped portion formed on each end of the third base portion 360 in a longitudinal direction, fittingly coupled with the third base portion 360 in a top-to-bottom direction, and of which an upper surface is treated in a round, wherein the first block body 100 and the second block body 200 are arranged between the third block body 300 and a neighboring third block body 300.

According to still another characteristic of the present invention for achieving the objects as described above, a protruding column R or a concave column S is formed on a side surface of the first wing portion 120 and the first base portion 160 of the first block body 100 and a side surface of the second wing portion 220 and the second base portion 260 of the second block body 200 so that the protruding column R is fittingly coupled with the concave column S.

According to still another characteristic of the present invention for achieving the objects as described above, a plurality of traction rings P are formed on the first block body 100, the second block body 200, and the third block body 300, and a plurality of fastening piles K are inserted thereinto in order to fasten each block body.

Each of bottom surface of the first base portion 160, the second base portion 260, and the third base portion 360 includes a plurality of fastening leg portions.

Further, a height of the third block body 300 is larger than heights of the first block body 100 and the second block body 200.

According to configurations of the present invention, the following effects may be expected.

First, a block structure for preventing sand erosion of the present invention is positioned in the sea and may effectively control drift sand, thereby effectively preventing coastal sand loss.

Second, since a block structure for preventing sand erosion do not remain in a fixed shape but may come in various shapes of blocks capable of actively coping with the height and speed of the wave varying, sand loss due to environmental changes may be efficiently prevented.

Third, an appropriate block may be selected according to the topography, environment, tide shape, and beach shape, and assembled in various ways, leading to easy and economical installation, and resultantly effectively preventing sand loss.

Fourth, a means for firmly securing the block to ground to prevent the loss of the block is disclosed, and thus by a simple and fixed force method, sand loss may be consistently prevented.

Fifth, sand pushed out may be collected at low tide, and the sand pushed out may be pushed toward a coast or coastal side at high tide.

Sixth, it is possible to prevent the loss of sand by an offshore current moving to the side of the coast, as well as the waves pushed from the continental shelf side to the coast and then pushed out to the continental shelf again.

DETAILED DESCRIPTION OF EXEMPLARY EMBODIMENTS

Figure 1:
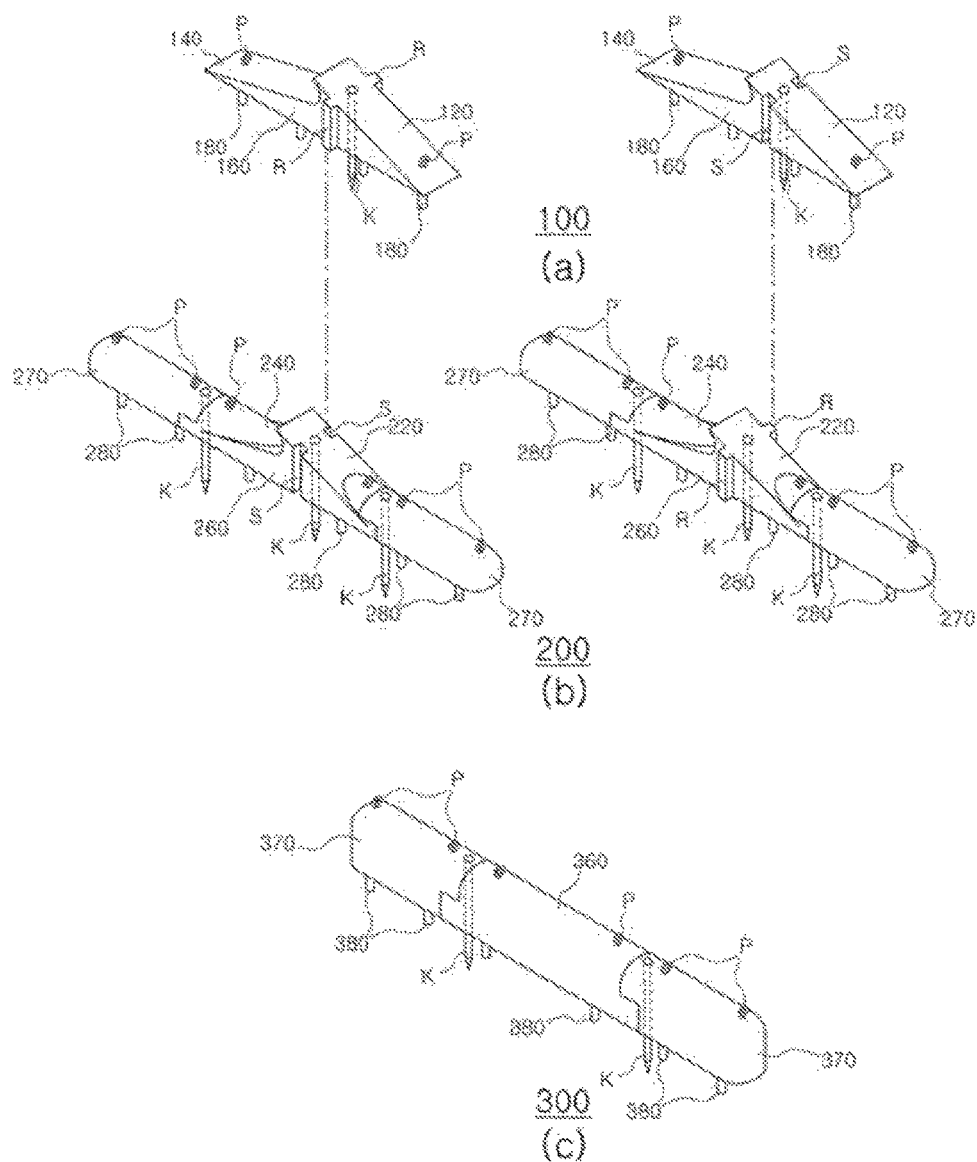
FIGS. 1a, 1b, 1c are perspective views illustrating a first block body, a second block body, and a third block body according to an embodiment of the present invention.
Figure 2:
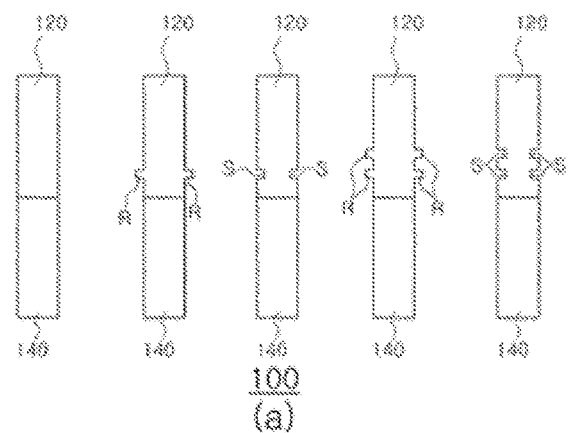
FIGS. 2a, 2b are views illustrating various shapes of block bodies as illustrated in FIG. 1.
Figure 2:
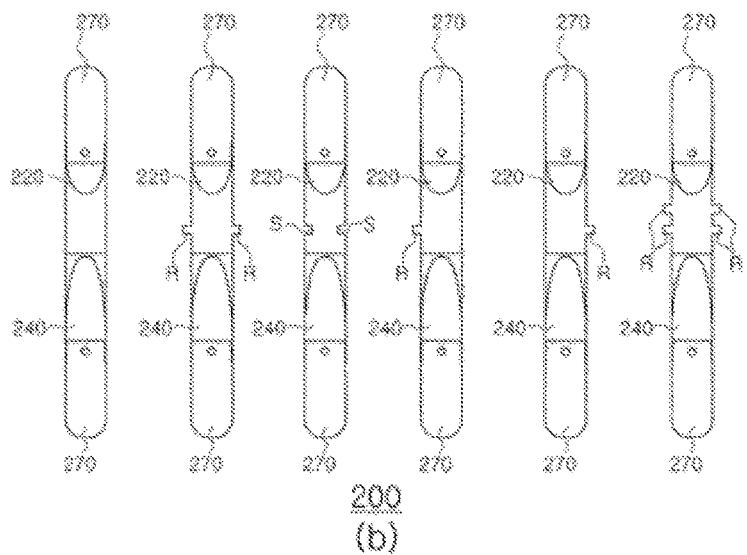

The present invention is described with reference to FIGS. 1 to 3. A block structure for preventing sand erosion generally comprises a first block body, a second block body, and a third block body. The first block body is constituted in a single body, but the second block body and the third block body are constituted in three bodies. Each block body is formed of a concrete material, and each block body having a different shape may be assembled and installed according to various environmental conditions, such as topography, tide, and beach condition. Hereinafter, each component is described in detail as below.

The first block body 100 is positioned in the sea, is a block body which is mainly put at mild tide, and comprises a first wing portion 120, a first inclined portion 140, a first base portion 160, and a fastening leg portion 180. Referring to FIG. 1a, the first block body 100 is described as below.

The first wing portion 120 facing the sea and having an inclined surface gradually increasing from an outer side to a central side is positioned toward sea. An inclination angle of the first wing portion 120 is preferably 30 degrees to 45 degrees from the water surface. At 30 degrees or less, the attenuation effect on the wave height is insufficient, and at 45 degrees or more, resistance to wave is generated and the effect is attenuated so that due to the resistance the wave may not pass over the wing portion not to push sand toward a coastal side. Thus, the angle as described above has a critical effect.

The first inclined portion 140 is positioned opposite the first wing portion 120 and comprises an inclined surface facing a coastal side and gradually increasing from an outer side to a central side and a hooked shape formed in an end thereof. The first inclined portion 140 is positioned toward a coastal side. When a high crest of a wave entered at high tide is pushed toward the sea at low tide, sand of a sea bottom is also pushed toward the sea, the hook-shaped first inclined portion 140 of the first block body 100 prevents sand from moving so that the sand is gathered along with the first inclined portion not to be carried away. The first base portion 160 is connected to the hook-shaped first inclined part 140, and an opposite side of the first base portion 160 is connected to the first wing portion 120 having the inclination angle to be configured to a bottom of the first block body 100. The fastening leg portions 180 are in plural and are installed on a bottom surface of the first base portion 160 to prevent the first block body 100 from being moved or lost by wave force.

The second block body 200 positioned in the sea has a bar-shape in a longitudinal direction. When a wave is high or is fast, the second block body 200 is a corresponding block and is formed in three bodies comprising a second base portion 260 located at the center thereof and two second extension portions 270 located at both sides of the second base portion 260.

Referring to FIG. 1b, the second block body 200 is described as below. A second wing portion 220 having an inclined surface that gradually increases from an outer side to a central side is positioned toward the sea. An inclination angle of the second wing portion 220 is preferably 30 degrees to 45 degrees from the water surface, but it is preferable that the inclination angle of the second wing portion 220 is formed at a lower slope than a slope formed at the angle of the first wing portion 120. An opposite side of the second wing portion 220 is positioned toward a land (coast) and comprises a second inclined portion 240 having a hook shape in an end thereof.

When a low crest of wave entering at high tide is pushed toward the sea side at low tide, the sand of seabed is also pushed toward the sea side. The second inclined portion 240 starting from the hook shape of the second block body 200 interrupts the movement of the sand so that the sand is gathered along the steep slope of the curved portion 240 not to be swept out. The second base portion 260 forms a lower portion of the second wing portion 220 and the second inclined portion 240, and a stepped portion is formed on both ends thereof in a longitudinal direction. The stepped portion formed on both ends in a longitudinal direction of the second base portion 260 is coupled with the second extension portion 270 in a longitudinal direction, and thus total three bodies are constituted in the second block body 200. In other words, the second extension portion 270 is engaged with the second base portion 260 in a top-bottom direction, and an upper surface of the second extension portion 270 is subjected to rounding treatment to reduce frictional force with wave force. Due to the second extension portion 270 of the second block body 200, the total length of the second block body 200 is larger than that of the first block body 100. Such difference in length induces a sand movement to be bumped more efficiently, preventing sand loss. The plurality of fastening leg portions 280 are provided on a bottom surface of the second base portion 260 to prevent the second block body 200 from being moved or lost by the wave force.

The third block body 200 positioned in the sea has a bar-shape in a longitudinal direction. When the third block body is parallelly arranged with the first block body and second block body in a direction perpendicular to the longitudinal direction (transverse direction), it is positioned at the edge of the arrangement to serve as a wall. The third block body 300 is formed to have a height larger than those of the first block body 100 and the second block body 200 and comprises a third base portion 360 and two third extension portions 370 fittingly combined with both ends of the third base portion 360 in a longitudinal direction.

Referring to FIG. 1c, the third block body 300 is described as below. A third base portion 360 of the third block body 300 is rounded on the upper surface thereof, and a stepped portion is formed at both ends in a longitudinal direction of the third block body 300. A third extension portion 370 is inserted and combined with the stepped portion formed in both the ends in a top-to-bottom direction. Since the block structure is installed in the sea where waves are present, it is effective to insert the block structure downwards not to receive resistance by the wave. An upper surface of the third extension portion 370 is rounded to smoothly reduce the friction force of the waves so that the waves may cross thereover. A plurality of fastening leg portions 380 are provided on a bottom surface of the third base portion 360 to prevent the third block body 300 from being moved or lost by the wave force. In the present invention, side surfaces of the first block body, the second block body, and the third block body means a direction perpendicular to the longitudinal direction.

As illustrated in FIGS. 2a, 2b, the first block body 100 and the second block body 200 are inserted and combined with each other in the present invention. FIG. 1a illustrates an appearance of which a protruding column R or a concave column S is formed on the side surface of the first wing portion 120 and the first base portion 160 of the first block body 100, and FIG. 2a illustrates an appearance of which a protruding column R or a concave column S is formed on the side surface of the second wing portion 220 and the second base portion 260 of the second block body 200. In other words, the first block body 100 on which the protruding column R is formed is coupled with the second block body 200 on which the concave column S is formed. Only one the protruding column R or the concave column S may be provided, but a plurality of columns may be formed as necessary to provide a stronger fastening force.

Figure 3:
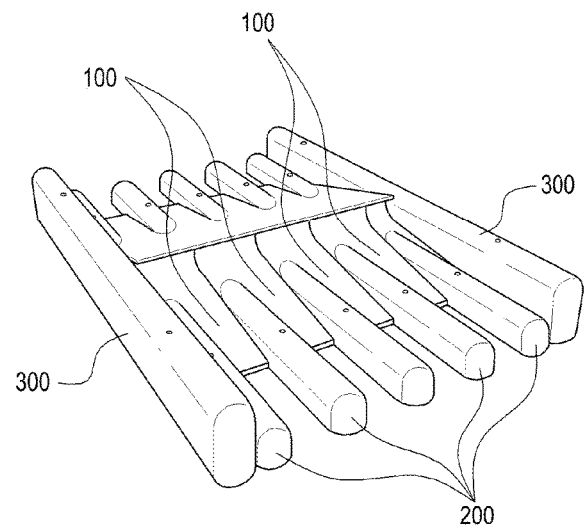
FIG. 3 is a three-dimensional view in which each block body of the present invention is assembled.
Figure 4:
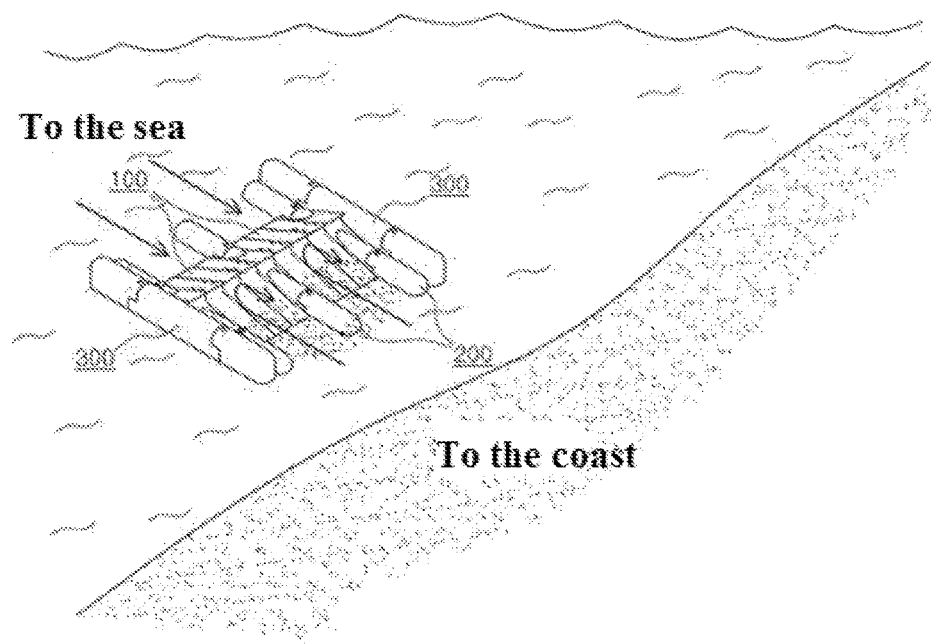
FIG. 4 is a view illustrating a shape in which the present invention is installed in the sea.
Figure 5:
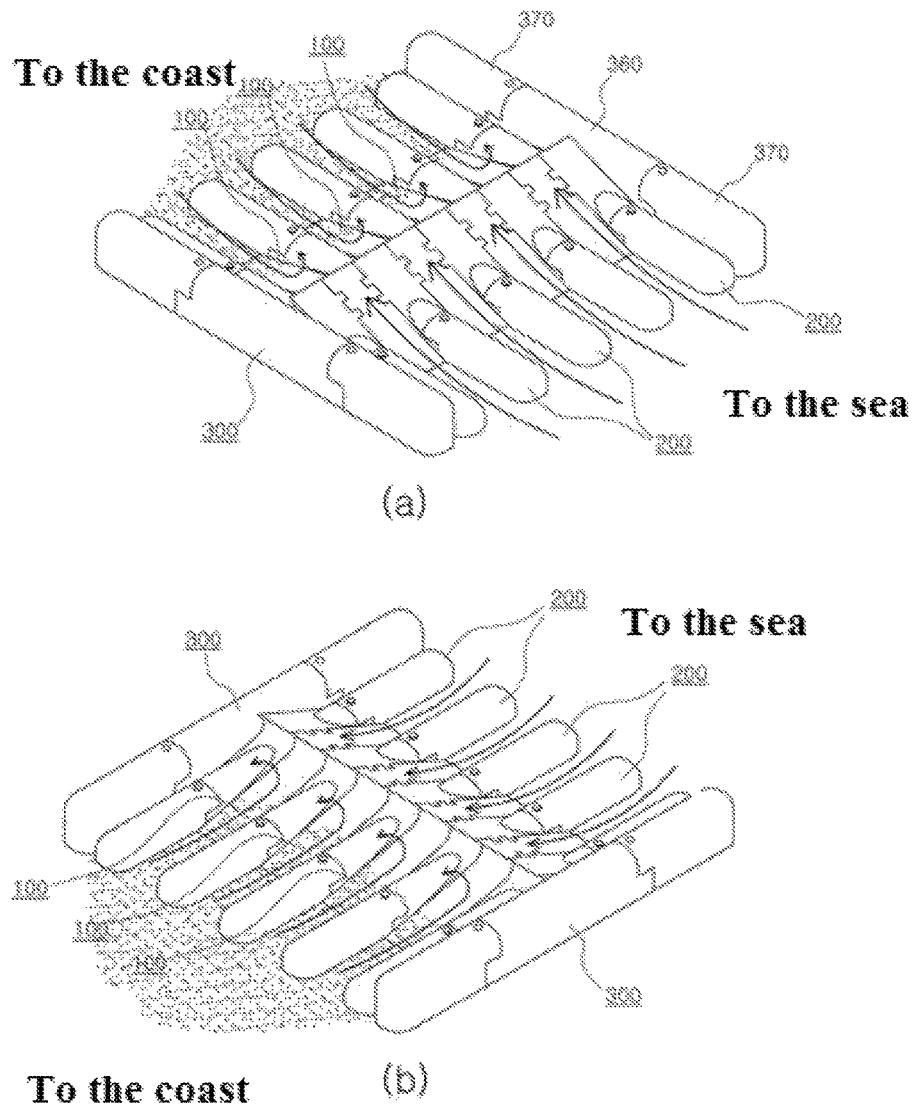
FIGS. 5a, 5b are installation views illustrating a block structure for preventing sand erosion according to another embodiment of the present invention.
Figure 6:
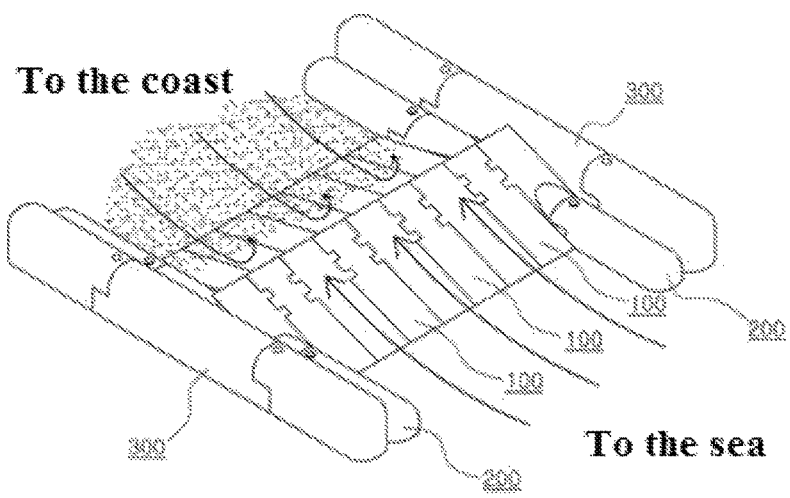
FIGS. 6a, 6b, are installation views illustrating a block structure for preventing sand erosion according to still another embodiment of the present invention.
Figure 6:
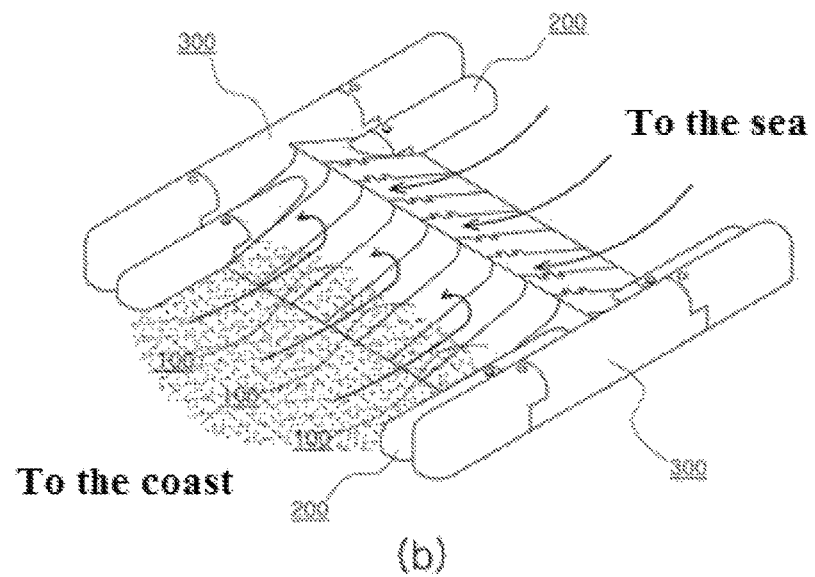

FIG. 3 is a three-dimensional view illustrating a shape after coupling with the first block body 100, the second block body 200, and the third block body 300 each other. As shown in FIG. 3, the first block body 100 and the second block body 200 are different in length from each other, so that an empty space is generated between one second block body 200 and a neighboring second block body 200, and sand pushed out from a shore is collected in this empty space. Further, a height of the third block body 300 is larger than a height of the first block body 100 and the second block body 200 except a hook portion, so that once sand pushed from coast is collected, it is difficult for the sand to escape out of the block structure. Further, there is an advantage that the collected sand is not lost due to the height of the third block 300 even if wave is pushed to or released from the side by an offshore current.

According to the present invention, one or more combined block body as shown in FIG. 3 may be installed depending on a coastal shape, a coastal width, intensity of a wave, or an amount of sand.

The first block body 100 and the second block body 200 respectively have the first inclined portion 140 and the second inclined portion 240 facing coastward direction and having a hook shape at an end thereof toward the coast, and have the first wing portion 120 and the second wing portion 220 facing the sea (continental shelf) and gradually inclined upwardly from an outer side to an inside. Such hook-shaped inclined portion may collect sand which is lost toward the sea in the coast or sea near the coast at low tide and may push the collected sand toward the coast or coast side by a wave being pushed at next high tide.

Even on coast with much offshore current, due to the height of the third block body 300, sand may be collected on the first block body 100 and the second block body 200, and the collected sand may be moved toward a coast at the high tide. Loss of sand caused by a wave is generally prevented and the sand may be pushed toward the coast, ultimately preventing the loss of coastal sand.

With reference to FIGS. 4 to 6a, 6b, another embodiment according to the present invention is described as below. The block structure for preventing sand erosion may be assembled and installed by variously changing the first block body and the second block body depending on state and environment of the terrain and the current. The first block body 100 is often used when the current is weak or gentle, and the second block body is often used when the current is strong. In this case, the third block body 300 is provided at the starting point and the end point of the block structure to act as a breakwater.

In other words, as such drawings, in an arrangement of the block structure, the first block body, the second block body, and the third block body are arranged in the longitudinal direction and paralleled in a perpendicular side. The third block 300 is positioned at the edge of the arranged block structure, and the first block body 100 and the second block body 200 are alternatively or repeatedly positioned between third block bodies 300. For example, when the current is strong and the waves are severe, the first block body 100 and the second block body 200 may be alternately installed such as FIG. 4. When the current is gentle, it is also possible to install the second block body 200 after the first block body 100 is repeatedly installed such as FIGS. 6a, 6b.

In other words, the third block body 300 is always positioned at the edge of the arrangement of the block bodies so as to serve as a breakwater. However, in a region where the height of wave is high, the first block body 100 is arranged relatively less than the second block 200 to effectively prevent reverse flow phenomenon, efficiently controlling sand loss prevention.

In order to simplify the assembly and installation of such a block structure, a plurality of traction rings P are formed on the first block body 100, the second block body 200 and the third block body 300, thereby facilitating transportation, and a plurality of fastening piles K are inserted into the block bodies for the purpose of assembling and fastening the block bodies.

DESCRIPTION OF REFERENCE NUMBER

100: first block body,
120: first wing portion

140: first inclined portion,
160: first base portion
180: fastening leg portion,
200: second block body
220: second wing portion,
240: second inclined portion
260: second base portion,
270: second extension portion
280: fastening leg portion,
300: third block body
360: third base portion,
380: fastening leg portion The present invention relates to a block structure for preventing sand erosion, controlling sand of coastal or at sea of the coastal side not to be lost by a wave, and there is industrial application.

What is claimed is:

1. A block structure for preventing sand erosion, comprising:
    a first block body comprising,
        a first wing portion facing a sea and having an inclined surface gradually increasing from an outer side to a central side,
        a first inclined portion positioned opposite the first wing portion and having an inclined surface gradually increasing from an outer side to a central side and having a hook shaped end, and
        a first base portion constituting a lower body of the first wing portion and the first inclined portion; and
    a second block body shaped as a long bar longer than the first block body and positioned at a side of the first block body, the second block body comprising,
        a second wing portion facing sea and having an inclined surface gradually increasing from an outer side to a central side,
        a second inclined portion positioned opposite the second wing portion, and facing a coastal side, and having a hook shaped end,
        a second base portion constituting a lower body of the second wing portion and the second inclined portion and of which a stepped portion is formed on each end, and
        a second extension portion extendedly coupled with the stepped portion formed on each end of the second base portion in a longitudinal direction and having rounded upper surface, wherein the first block body and the second block body are arranged side by side in plurality.

2. The block structure of claim 1, further comprising a bar-shaped third block body comprising:
    a third base portion having a rounded upper surface and a stepped portion formed on each end in a longitudinal directions of a lower body thereof; and
    a third extension portion extendedly coupling with the stepped portion formed on each end of the third base portion in a longitudinal direction, fittingly coupled with the third base portion in a top-to-bottom direction, and of which an upper surface is treated in a round, wherein the first block body and the second block body are arranged between the third block body and a neighboring third block body.

3. The block structure of claim 2, wherein a plurality of traction rings (P) are formed on the first block body, the second block body, and the third block body, and a plurality of fastening piles (K) are inserted thereinto in order to fasten each block body.

4. The block structure of claim 2, wherein each of bottom surface of the first base portion, the second base portion, and the third base portion includes a plurality of fastening leg portions.

5. The block structure of claim 2, wherein a height of the third block body is larger than heights of the first block body and the second block body.

6. The block structure of claim 1, wherein a protruding column (R) or a concave column (S) is formed on a side surface of the first wing portion and the first base portion of the first block body and a side surface of the second wing portion and the second base portion of the second block body so that the protruding column (R) is fittingly coupled with the concave column (S).

* * * * *